INVENTOR.
JEAN MARIE NOLF
BY
Frank R. Trifari
AGENT

United States Patent Office 3,564,388
Patented Feb. 16, 1971

3,564,388
CONTROL CIRCUIT ARRANGEMENT FOR CONTROLLED RECTIFIERS
Jean Marie Nolf, Forst, Belgium, assignor to U.S. Philips Corporation, New York, N.Y.
Filed May 7, 1968, Ser. No. 727,311
Claims priority, application Netherlands, May 13, 1967, 6706733
Int. Cl. H02p 13/26; H02m 7/00
U.S. Cl. 321—18         10 Claims

ABSTRACT OF THE DISCLOSURE

A system for regulating the voltage to a load as a linear function of an input signal comprises a controlled rectifier in series with the load and a source of full wave rectified AC voltage. A control circuit is connected to the rectifier gate electrode to control the firing angle as a function of said input signal. The control circuit includes a comparator to which is applied the input signal and a cosinusoidal sawtooth signal in synchronism with the rectified AC pulses, the amplitude thereof being directly proportional to the amplitude of the rectified AC pulses and starting from the zero level of the input signal. Upon equality of the two signals, the comparator supplys a control signal to the rectifier gate electrode.

---

Figure 1:
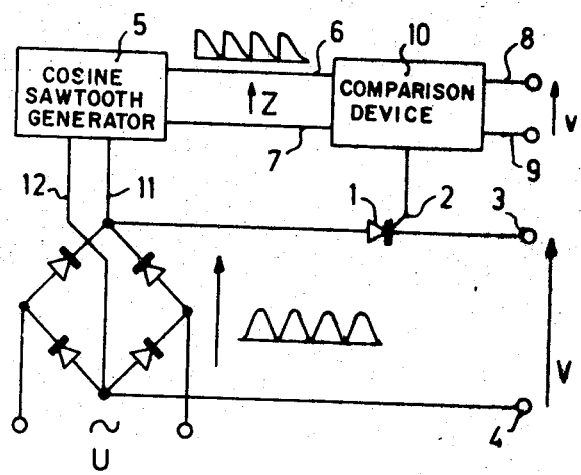

The present invention relates to an electric power control system. A typical power control system comprises a control circuit arrangement for supplying a control signal for firing one or more controlled rectifiers fed in phase with a voltage comprising a sequence of sinusoidal half-waves, in the pass direction. The firing instant is variable relative to the beginning of each sinusoidal half-wave, in accordance with an input signal applied to the circuit arrangement. The circuit arrangement includes a generator for supplying a sequence of sawtooth signals each of which appears simultaneously with a corresponding sinusoidal half-wave of the supply voltage, and a comparison device for comparing the slowly varying edge of each sawtooth signal with the input signal and delivering said control signal when the value of said edge reaches the value of said input signal.

As is known, controlled rectifiers, such as thyratrons, thyristors and the like, are extensively used in control systems because they are essential elements for obtaining controllable high-power voltage sources adapted to be controlled by low-power input signals. Such a voltage source is generally fed with the sinusoidal alternating voltage of an AC supply source and the firing instant during each positive half-cycle determines the mean voltage delivered for the process to be controlled, of which the detected error or a function thereof serves in turn to determine the firing instant. This requires a circuit arrangement which supplys a control signal for the firing of the rectifiers at a variable instant as a function of the input signal applied to the circuit arrangement.

When a control system is designed with controlled rectifiers, the arrangement and proportioning of the required elements of the control system and the determination of the required transfer functions depend upon the transfer functions of the elements which, from the beginning are included in the control circuit: the process to be controlled and the controllable voltage source.

It is always desirable for the elements included in the control circuit to have linear transfer functions. The transfer function of the quantity to be controlled can then readily be determined relative to the selected desired value on the one hand, and also as a function of the disturbances to be exposed. The conditions of accuracy and stability are then also independent of the selected desired value and of the instantaneous value of the disturbances. This enables such a control system to be calculated and proportioned beforehand for optimum accuracy and stability. In contradistinction, if elements having non-linear transfer functions are included in the control circuit, the accuracy and stability conditions vary as a function of the selected desired value and the instantaneous value of the disturbances. Optimum accuracy and stability are then only obtained for a single operating point of the process instead of over a wide range.

It is an object of the invention to provide a modular circuit arrangement for supplying the control signal for controlled rectifiers. Such a circuit arrangement must be able to serve as a standardized unit in designing and manufacturing the widest possible range of control systems. From the preceding it will be clear that a first requirement is that this control circuit arrangement provides a linear relationship between the input signal and the mean voltage supplied by the rectifiers. A second requirement is that this linear relationship must not be disturbed by an external disturbance foreign to the input signal, in this case the variations in shape, frequency and amplitude of the AC supply voltage. Control circuit arrangements for firing thyratrons and the like are known in which a sawtooth signal and a voltage level which varies with the input signal are compared, and a firing signal for the thyratrons is delivered when equality is reached. However, such a control circuit arrangement does not provide the required linear relationship. Control circuit arrangements are also known in which an alternating voltage shifted 90° in phase relative to the supply voltage is compared with a voltage level which varies with the input signal. These circuit arrangements can only initiate one firing per cycle of the supply voltage and hence cannot be used for thyratrons fed with a full-wave rectified alternating current. In addition, these circuit arrangements are sensitive to disturbances in the amplitude of the supply voltage and only provide the required linear relationship for one predetermined value of the supply voltage.

Hence, it is an object of the invention to provide a modular control-circuit arrangement for controlled rectifiers which does not suffer from the said disadvantages. For this purpose, use is made of a control circuit arrangement comprising a generator for supplying a sequence of sawtooth signals each of which appears simultaneously with a corresponding sinusoidal half-wave of the supply voltage, and a comparison device for comparing the slowly varying edge of each sawtooth signal with the input signal and delivering said control signal when the value of said edge reaches the value of said input signal.

According to the invention, this circuit arrangement is characterized in that the sawtooth signals have an amplitude directly proportional to the amplitude of the sinusoidal half-waves and a slowly varying edge of cosinusoidal shape ending with a signal value corresponding to an input signal value equal to zero.

Figure 2:
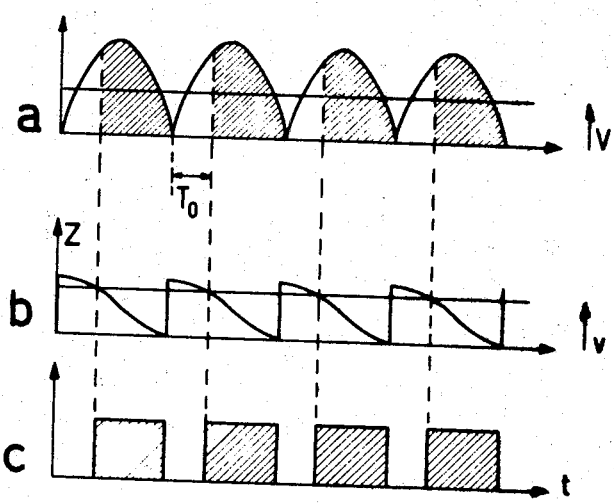
Figure 3:
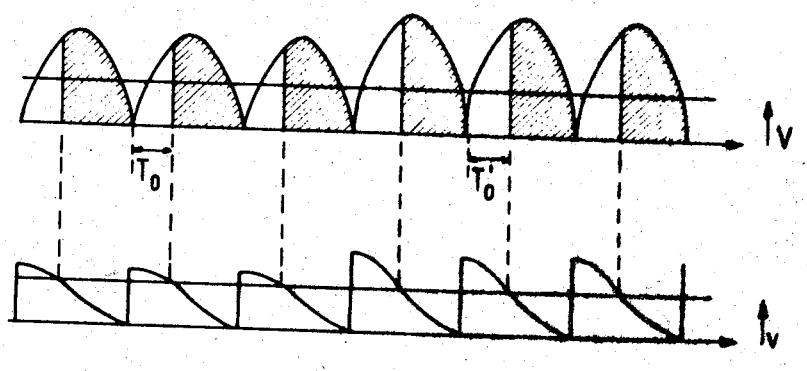
Figure 4:
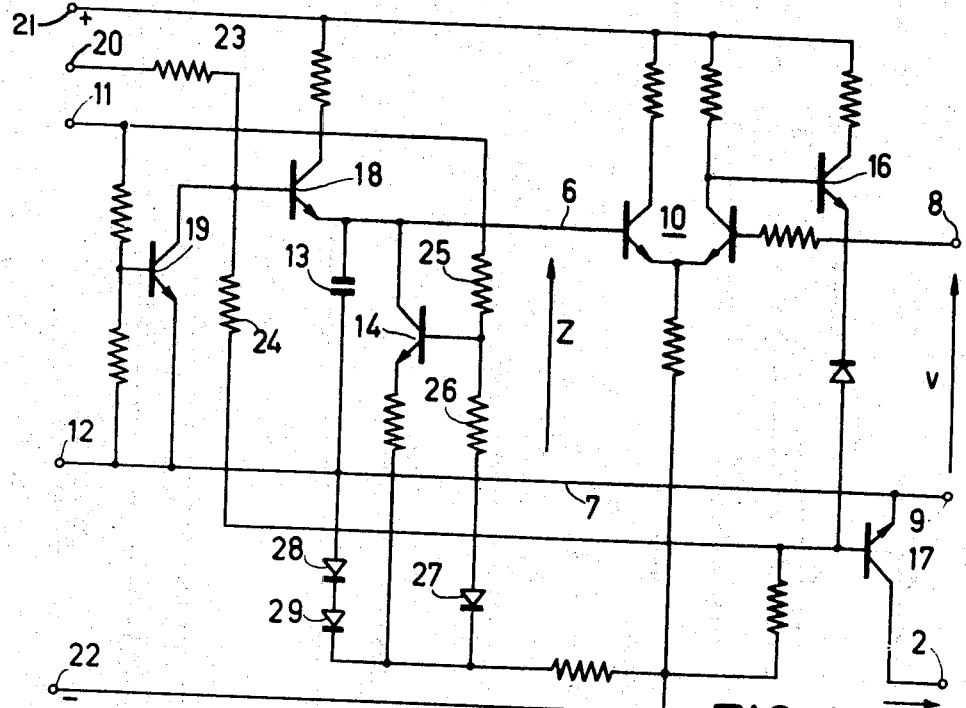
Figure 5:
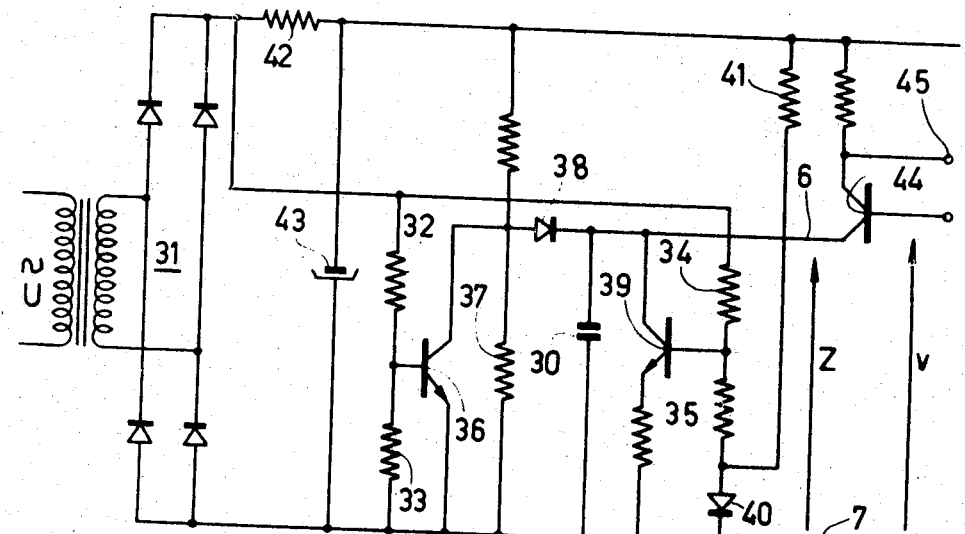
Figure 6:
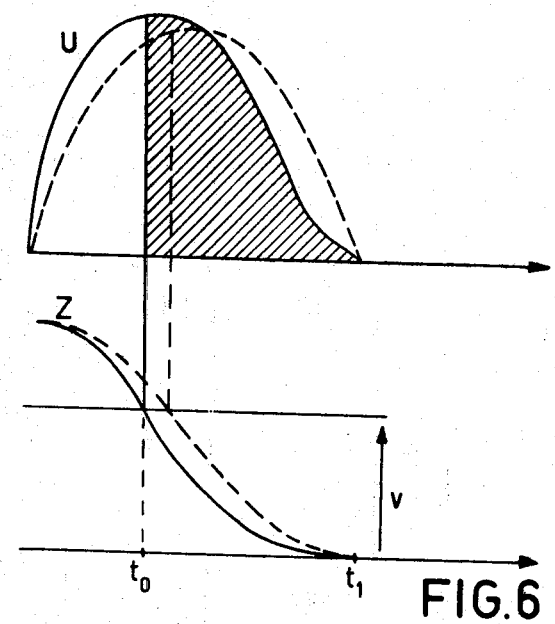
Figure 7:
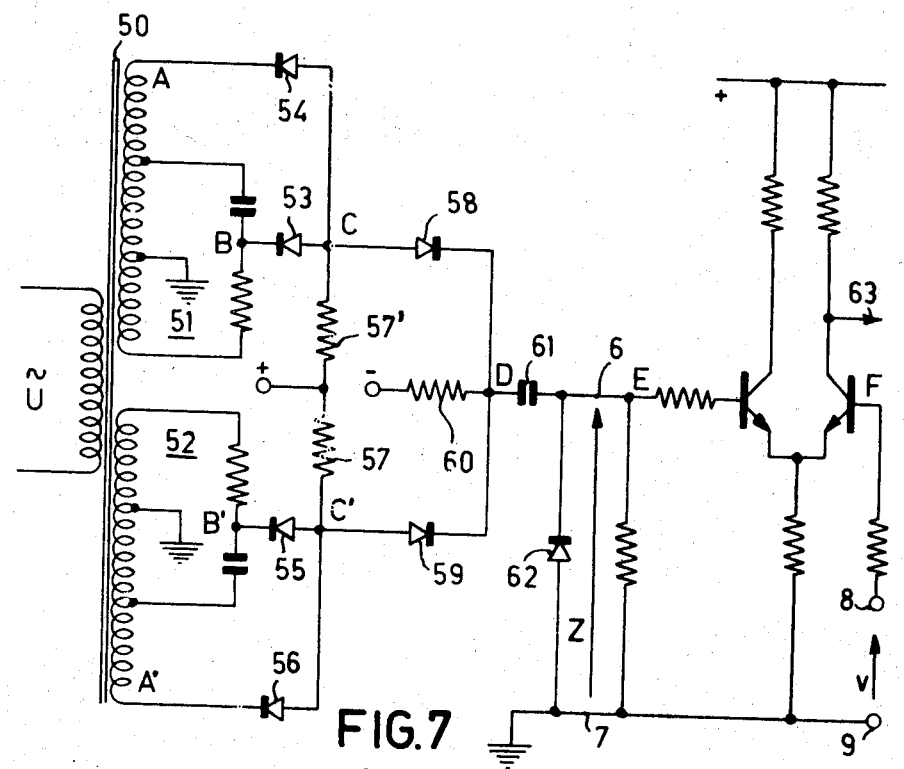
Figure 8:
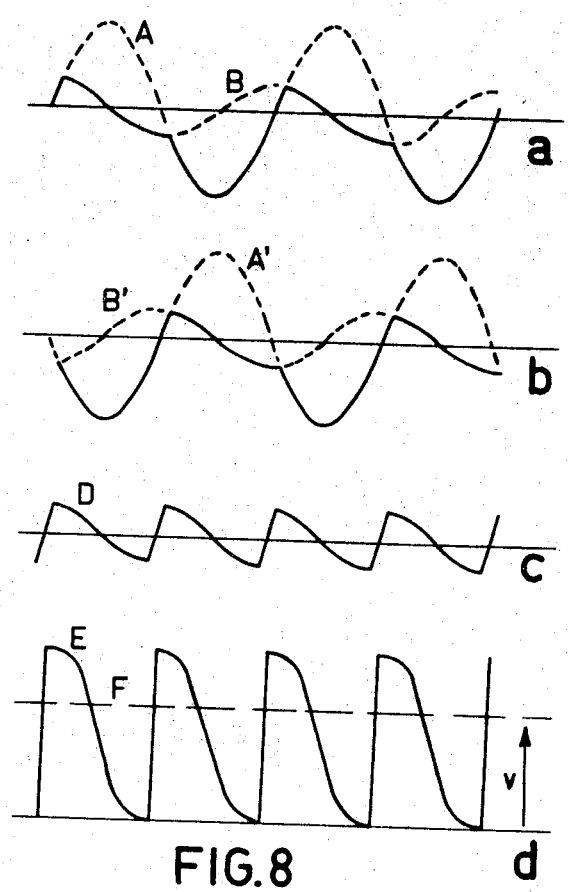
Figure 9:
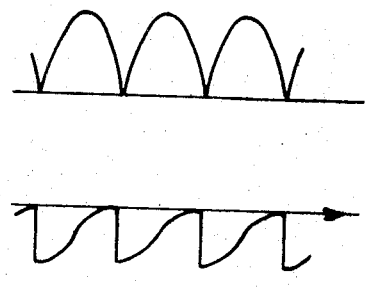

The principle of the invention and some embodiments thereof will now be described more fully with reference to the accompanying drawing, in which:

FIG. 1 is a circuit diagram of a circuit arrangement for supplying a variable voltage, FIG. 2 shows the signals delivered at certain points of this circuit arrangement, FIG. 3 shows how these signals change with variations of the AC supply voltage, FIG. 4 shows a first embodiment of a circuit arrangement in accordance with the invention, FIG. 5 shows a second embodiment of a circuit arrangement in accordance with the invention, FIG. 6 shows how some signals in these arrangements change with variations in the shape of the AC supply, FIG. 7 shows a third embodiment of a circuit arrangement in accordance with the invention, FIG. 8 shows how the signals in the circuit arrangement of FIG. 7 are combined to form a cosinusoidal sawtooth signal, FIG. 9 shows a sawtooth signal in which the slowly varying edge slopes in a direction opposite to that illustrated in the preceding examples, and the level of this sawtooth.

FIG. 1 shows a simple circuit diagram of a thyristor 1 which is fed with a full-wave rectified alternating voltage (FIG. 2a) taken from an AC supply and comprising sinusoidal half-waves having an angular frequency $\omega$ and a peak voltage U. The firing time relative to the beginning of each half sine wave is determined by the occurrence of the control signal (FIG. 2c) which is applied to the control electrode 2 of the thyristor to fire the latter. The mean voltage V (FIG. 2a) delivered by this thyristor at terminals 3 and 4 depends upon the time $T_0$ between the beginning of each half sine wave and the firing instant:

$$V = \frac{U}{\pi}[1 + \cos \omega T_0] \qquad (1)$$

The control signal (FIG. 2c) is supplied by the control circuit and firing takes place at the instant at which a sawtooth signal Z produced by a sawtooth generator 5 at its output terminals 6 and 7 reaches the level of the input signal V (FIG. 2b) which is applied to the arrangement through two input terminals 8 and 9. The signals Z and V are compared in a comparison device 10.

The measures taken in accordance with the invention to achieve linearity between the mean output voltage V and the input signal V regardless of the supply voltage and to eliminate the influence of any variations in amplitude of the supply voltage consist in providing that the sawtooth signal is cosinusoidal and has an amplitude directly proportional to U and starts from a level which is the zero level of the input signal (FIG. 2b). Under these conditions, the sawtooth signal Z can be written as a time function:

$$Z = \frac{U}{A}[1 + \cos \omega t] \qquad (2)$$

and also the firing delay time $T_0$ can be found from the equation $$v = \frac{U}{A}[1 + \cos \omega T_0] \qquad (3)$$

From (1) and (3) it follows that regardless of the mains voltage U and its fluctuations:

$$V = \frac{A}{\pi} v \qquad (4)$$

When the amplitude of the half sine waves of the supply voltage (FIG. 2a) increase, the sawtooth signals Z increase proportionally but the lower peaks remain on the zero level of the input signal (FIG. 3). Subsequently an increase of the amplitude of the sine waves results in an increase of the firing delay time $T_0$ so that the mean output voltage remains unchanged. Thus, the sawtooth generator is also influenced by the amplitude of the supply voltage through terminals 11 and 12.

A few embodiments of control arrangements embodying the invention will now be described. Elements corresponding to those of FIG. 1 will be designated by the same reference numerals.

The arrangement shown in FIG. 4 includes a generator which produces a cosinusoidal sawtooth voltage Z on leads 6 and 7. This voltage is produced by a capacitor 13 being abruptly charged through a transistor 18 at the beginning of each half sine wave of the supply voltage and being discharged through a transistor 14 during the remainder of this half sine wave. The arrangement further includes a trigger circuit 10 which compares the sawtooth voltage taken from the capacitor with the input signal v applied through terminals 8 and 9. The result of the comparison is applied through a transistor 16 to a power transistor 17 which, via the lead 2, delivers the output signal with a power sufficient to control several thyristors, as the case may be, through individual trigger circuits. A transistor 19 serves to provide a short circuit between the base and the emitter of the charging transistor 18 for the duration of each sinusoidal half wave of the supply voltage. Thus, the capacitor can only be charged when the supply voltage is equal to zero. To the terminals 11 and 12 is applied a voltage the instantaneous value of which is directly proportional to the instantaneous value of the rectified supply voltage.

Terminals 12 and 20 are connected to a direct-voltage source which delivers a voltage the value of which is proportional to the amplitude of the supply voltage. Terminals 21 and 22 are connected to a source of a voltage which is positive and negative respectively with respect to the terminal 12.

The operation of this arrangement is as follows. Since a full-wave rectified alternating voltage is applied across terminals 11 and 12, the transistor 19 is always bottomed, except during the short times in which this rectified alternating voltage is equal to zero. These times consequently are the only possible times during which the base of the transistor 18 is not short-circuited to the zero potential of the terminal 12, enabling the capacitor 13 to be charged. When the transistor 19 is cut-off, the transistor 17 is conducting shortly before the passage through zero of the rectified alternating voltage, so that the capacitor 13 is rapidly charged through the transistor 18 during the very short time in which the transistor 19 is cut-off. During this rapid charging through the transistor 18, which constitutes the rapidly varying edge of the sawtooth voltage Z, at a certain instant the voltage Z will exceed the input voltage v with the result that the trigger circuit 10 changes over to the state in which transistors 16 and 17 become conducting. Consequently the base of the transistor 17 will reach the zero potential of the terminal 12 increased by its base-emitter threshold voltage. This threshold voltage substantially cancels out that of a rectifier through which the terminal 20 is fed. Hence, a voltage divider 23, 24 through terminals 12 and 20 is connected to a voltage the amplitude of which is directly proportional to the amplitude of the sinusoidal half waves of the supply voltage for the thyristors. For the rest of the time in which the transistor 19 is not short-circuited yet, the base of the transistor 18 is at a similar voltage. This ensures that the capacitor 13, via the emitter of the transistor 18, assumes a voltage substantially equal to the base voltage of this transistor at the instant at which the short-circuiting effect of the transistor 19 begins. The transistor 18 is then cut-off and the capacitor can start to discharge. The amplitude of the steep edge of the sawtooth consequently is directly proportional to the amplitude of the half sine waves of the supply voltage. The slowly varying edge now to be produced by the discharge must be cosinusoidal and its amplitude must also be proportional to the amplitude of the sine waves and in addition it must be ensured that the capacitor is fully discharged at the end of the half sine wave. This is achieved by discharging it through a discharging transistor 14 with a current having the shape of the half sine wave which feeds the controlled thyristor at this instant. Thus, the sawtooth voltage automatically is cosinusoidal and its amplitude is proportional to that of this half sine wave. The said sinusoidal discharging current is obtained by giving to the base and emitter voltages of the transistor 14 and the voltage across its emitter resistor such a sinusoidal form by means of a voltage divider 25, 26. A diode 27 is included for compensating the non-linearity of the emitter current relative to the emitter-base voltage. A proper choice of the values of the resistors 25 and 26 ensures that the voltage across the capacitor 13 becomes zero exactly at the end of the half sine wave. When this value is correctly set for one amplitude it will also be so for any other amplitude, since the charging and discharging is proportional to this amplitude. By means of diodes 28 and 29 a small negative voltage is applied to the emitter of the transistor 14 in order to maintain the desired linearity between emitter current and base voltage at a low emitter-collector voltage also. During the falling off of the voltage Z across the capacitor, the trigger circuit will change state at the desired instant so that the transistor 17 is cut off. The connection between the output 2 and the input of the thyristor circuit must then be such that this cutting off causes the thyristor to fire. The transistor 17 may serve to conduct away to the zero potential of the terminals 9 and 12 a pulse train applied to the firing electrode of each of a number of thyristors. Thus, the control signal supplied by the control arrangement according to this embodiment is the appearance at the output 2 of a short circuit to the terminal 9 at the desired firing instants.

FIG. 5 shows a modification of the arrangement shown in FIG. 4. Again, a capacitor 30 is charged by a voltage proportional to the amplitude of the supply voltage U. This voltage is rectified in a rectifier 31, and the resulting full-wave rectified alternating voltage is applied to voltage dividers 32, 33 and 34, 35 and also smoothed in an RC-circuit 42, 43 to provide a voltage which naturally is directed proportional to the amplitude of the rectified half sine waves. A transistor 36 has the same function as the short circuiting transistor 19 of FIG. 4. The base of the transistor 36 is connected to its emitter through the resistor 33 which forms part of a voltage divider fed with the full-wave rectified direct voltage derived from the supply. Even at a small voltage applied to its base this transistor is driven into saturation so that only during a short time at the beginning of each half cycle a resistor 37 is not short-circuited. During this short time the voltage across the resistor 37 is applied to the capacitor 30 through a diode 38. The resistor 37 and the diode 38 have the same functions as the resistor 24 and the transistor 18, respectively. In both cases the resistor acts as a direct-voltage source which delivers a voltage proportional to the amplitude of the half sine waves. The pn-junction of the transistor 18 or of the diode 38, respectively serves to pass the charging current from this direct voltage source to the capacitor when the short-circuit transistor 19 or 36, respectively is cut off and to reject the current in the opposite sense. Similarly to the preceding example, the capacitor is discharged cosinusoidally through a discharging circuit which includes the emitter-collector path of a transistor 39, to the base of which the rectified alternating voltage of the supply is applied through the voltage divider 34, 35. In order to ensure that the discharge is cosinusoidal this transistor is controlled within the linear range, i.e. similarly to the preceding example steps have been taken to ensure that the emitter current remains directly proportional to any emitter-base voltage for any emitter-collector voltage. This linearisation is effected by a diode 40 and by the connection to the positive potential through a resistor 41. Thus, there appears at the emitter of a comparison transistor 44 a sawtooth voltage Z at which, at least within a wide conduction angle range, satisfies the conditions in accordance with the invention which require the mean voltages delivered by the rectifiers controlled by means of this arrangement to be proportional to the input signal for any supply voltage amplitude. The input signal in the form of the voltage $v$ is applied to the base of this comparison transistor 44, and when Z becomes smaller than $v$ this transistor becomes conducting and delivers a firing signal at an output 45.

In both of the embodiments described, the sawtooth generator which satisfies the stipulations of the invention is a capacitor the terminals 6 and 7 of which form the output terminals of the generator and are connected to a charging device at one end and to a discharging device at the other. The charging device is designed so as to permit the capacitor to be charged only at the beginning of each sinusoidal half wave up to a voltage directly proportional to the amplitude of these sinusoidal half waves. The discharge device is designed and proportioned so that during each sinusoidal half wave of the supply voltage the capacitor is fully discharged by a current directly proportional to the instantaneous value of the voltage of the respective sinusoidal half wave. Obviously, provided that these conditions are satisfied other circuit arrangements of greater or lesser simplicity and utility may be used as the charging or discharging devices. In the embodiments shown, however, the voltage divider (25, 26 or 34, 35) may be adapted so that, even if the supply voltage is not sinusoidal, perfect linearity is maintained between the mean output voltage V of the thyristors and the input voltage $v$. In this case the fall $v$ of the voltage Z across the capacitor between instants $t_0$ and $t_1$ (FIG. 6) is always proportional to the integral of the supply voltage between these instants. Hence, in the case of a change in shape of the supply voltage the firing instant is changed so that the integral remains constant for a constant input voltage $v$.

Hereinbefore a first example was given of the manner in which a cosinusoidal sawtooth voltage, as shown in FIG. 2b, is obtainable. There are, however, alternative manners such as, for example, by 90° phase shifting of part of the sinusoidal supply voltage, as will be described hereinafter. The fact that this part is proportional to the supply voltage automatically ensures that the amplitude of the sawtooth signals varies with the amplitude of the supply voltage. However, additional steps have to be taken to ensure that the lower peaks of the sawtooth signals remain at the zero level (see FIG. 3). For this purpose a clamping circuit may be used. FIG. 7 shows an example of a control arrangement including such a sawtooth generator and such a clamping circuit. The generator comprises a transformer 50 having two symmetrical secondary windings the ends A and A' of which assume the potentials with respect to ground shown in FIGS. 8a and 8b. Across part of each secondary winding is connected a phase shifting RC-circuit 51 and 52, respectively which is proportioned so that the voltage at B and B' leads the voltage at A and A', respectively by 90° (FIGS. 8a and 8b). Diodes 53 and 54 ensure together with a resistor 57' connected to a source of a positive voltage that a point C always assumes the lower of the two potentials A and B (see the solid line in FIG. 8a). Diodes 55 and 56 together with a resistor 57 fulfil the same function for the potential of a point C' with respect to the potentials A' and B' (see the solid line in FIG. 8b). Diodes 58 and 59 ensure together with a resistor 60 connected to a source of a negative voltage that a point D always assumes the higher of the two potentials C and C'. Consequently, this point D is at a cosinusoidal sawtooth voltage the mean level of which, however, is equal to zero (FIG. 8c). Thus the level of the lower peaks varies with the supply voltage fluctuations. This level is brought to a constant zero value by means of a clamping circuit comprising a coupling capacitor 61 and a diode 62. The desired sawtooth voltage now appears at a point E (FIG. 8d). Very steep ascending edges can be obtained by making the ratio between the voltages at points A and B as large as possible. In the trigger circuit 10 this sawtooth voltage Z is compared with the input voltage $v$ and in the case of equality a signal appears at the output 63. Actually, the clamping circuit may be preceded by any cosine sawtooth generator in which the level of the peaks at the end of each cosinusoidal edge fluctuates. The only requirement this generator has to satisfy is that it must deliver sawtooth voltages the amplitudes of which vary in proportion with the supply voltage. The slowly varying edge may also be an ascending cosinusoidal edge lagging the supply voltage by 90° (FIG. 9), but in this case the level of the peaks at the end of each edge is the level of the upper peaks and it is this level which must keep the potential of the terminal 9, which is at the zero level relative to the input signal.

It is not necessary for the half sine waves which feed the controlled rectifiers to succeed one another immediately. There may be regular intervals between them. The main point is that at each half sine wave of the shape $$U \sin \omega t$$

a sawtooth voltage is produced, the signal relative to the zero level of the input signal being given by $$Z = \frac{U}{\pm A} [1 + \cos \omega t]$$

Under these conditions the transfer function $V/v$ will be and will remain linear with variations in the supply voltage and the mains frequency and will also be insensitive to these variations. This is extremely desirable for a modular element for use in control systems.

What is claimed is:

1. A circuit arrangement for supplying a control signal for firing one or more controlled rectifiers fed in phase in the pass direction with a supply voltage comprising a sequence of half sine waves, the firing angle being variable relative to the beginning of each sinusoidal halfwave in accordance with an input signal that is independent of the circuit output voltage and which is applied to the circuit arrangement, said circuit arrangement comprising a generator supplying a sequence of cosinusoidal sawtooth signals each of which appears simultaneously with a corresponding sinusoidal half wave of the supply voltage, said generator being responsive to the supply voltage so that the sawtooth signals have an amplitude directly proportional to the amplitude of the sinusoidal half waves and a slowly varying edge of sinusoidal wave shape ending at a signal value corresponding to the zero level of the input signal, and a comparison device for comparing the sawtooth signal with the input signal and operative to supply said control signal to the control electrode of the controlled rectifier when equality of the sawtooth signal and the input signal occurs.

2. An arrangement as claimed in claim 1, in which the sawtooth generator comprises a capacitor having terminals which form the output terminals of the generator means connecting said terminals to a charging device and to a discharging device, the charging device being arranged to charge the capacitor up to a voltage directly proportional to the amplitude of the sinusoidal half waves at the beginning of each halfwave, said discharging device being coupled to the capacitor completely during the remainder of each sinusoidal half-wave so that a discharge current flows that is directly proportional to the instantaneous value of the voltage of this half wave.

3. An arrangement as claimed in claim 2 wherein the discharging device includes a transistor with its emitter and collector connected in the capacitor discharge circuit, and means connecting the supply voltage for the controlled rectifiers to the base of said transistor via a voltage divider, said transistor being controlled within its linear range by the emitter-base voltage applied thereto.

4. An arrangement as claimed in claim 2, characterized in that the charging device comprises a direct-voltage source adapted to deliver a voltage proportion to the amplitude of the sinusoidal half waves and to the terminals of which the emitter and collector of a short-circuiting transistor are connected, means connecting the base of said transistor to its emitter through a resistor of a voltage divider connected to the source of supply voltage for the controlled rectifiers, so that when said supply voltage is positive the short-circuiting transistor is driven into saturation, and in that a p-n junction is included in the charging circuit so as to pass the current required to charge the capacitor up to the voltage supplied by the direct-voltage source when the short-circuiting transistor is cut-off.

5. An arrangement as claimed in claim 1, in which the sawtooth generator is designed to deliver a sequence of sawtooth signals having each an amplitude proportional to the amplitude of the sinusoidal halfwaves and a slowly varying edge of consinusoidal shape, characterized in that the output signal of this generator is applied to a clamping circuit which maintains the level of the tops at the end of each edge at the zero value.

6. A regulated power supply system for a load comprising, an AC source of sinusoidal voltage, rectifier means coupled to said voltage source to supply unidirectional half sine wave voltage pulses at its output terminals, a controlled rectifier connected between said output terminals and the load, comparison means having an output terminal coupled to the control electrode of said controlled rectifier to supply a control signal thereto for controlling the firing angle of said controlled rectifier relative to said half sine wave voltage pulses, means for supplying a variable DC input signal that is independent of the output voltage to one input of said comparison means, means for generating a cosinusoidal sawtooth signal in synchronism with said half sine wave pulses and having an amplitude that is proportional to the amplitude of the half sine wave pulses and starting from the zero level of the input signal, and means for coupling said cosinusoidal sawtooth signal to a second input of said comparison means so that said comparison means produces said control signal upon equality of the signals at its input terminals.

7. A system as claimed in claim 6 wherein said generating means comprises, a capacitor, means for charging said capacitor to a voltage level that is proportional to the amplitude of said half sine wave pulses at the start of each of said pulses, and means for sinusoidually discharging said capacitor to the zero level of the input signal.

8. A system as claimed in claim 7 wherein said capacitor discharging means comprises a transistor with its emitter-collector circuit connected in the capacitor discharge circuit and its base electrode coupled to an output terminal of said rectifier means.

9. A system as claimed in claim 6 wherein said generating means comprises, a capacitor, means reponsive to said AC voltage source for producing a direct voltage proportional to the amplitude of said AC voltage, means for briefly coupling said capacitor to said direct voltage producing means at the start of each half sine wave pulse, a discharge circuit for said capacitor comprising a transistor with its emitter-collector circuit connected across said capacitor, a voltage divider connected to receive said half sine wave pulses, and means connecting the base electrode of said transistor to a tap on said voltage divider.

10. A system as claimed in claim 6 wherein said generating emans comprises, R-C phase shift means coupled to said AC voltage source and a clamping circuit coupled to the output of said phase shift means so as to clamp the voltage level to the zero level of the input signal.

References Cited
UNITED STATES PATENTS

| | | | |
|---|---|---|---|
| 3,185,912 | 5/1965 | Smith et al. | 321—18 |
| 3,221,241 | 11/1965 | Greenberg et al. | 321—18 |
| 3,243,711 | 3/1966 | King et al. | 323—225SCRUX |
| 3,289,069 | 11/1966 | Todd | 307—252X |
| 3,336,531 | 8/1967 | Yamada | 323—119X |
| 3,412,314 | 11/1968 | Crane | 321—16 |

WILLIAM H. BEHA, Jr., Primary Examiner

U.S. Cl. X.R.

307—252; 323—22